US007206568B2

(12) United States Patent
Sudit

(10) Patent No.: US 7,206,568 B2
(45) Date of Patent: Apr. 17, 2007

(54) SYSTEM AND METHOD FOR EXCHANGE OF GEOGRAPHIC LOCATION AND USER PROFILES OVER A WIRELESS NETWORK

(75) Inventor: Isaias Sudit, Delray Beach, FL (US)

(73) Assignee: LOC-Aid Technologies, Inc., Boca Raton, FL (US)

( * ) Notice: Subject to any disclaimer, the term of this patent is extended or adjusted under 35 U.S.C. 154(b) by 38 days.

(21) Appl. No.: 11/068,181

(22) Filed: Feb. 28, 2005

(65) Prior Publication Data

US 2005/0202817 A1 Sep. 15, 2005

Related U.S. Application Data

(60) Provisional application No. 60/553,241, filed on Mar. 15, 2004.

(51) Int. Cl.
*H04Q 7/20* (2006.01)

(52) U.S. Cl. .............................. 455/404.1; 455/404.2; 455/456.1

(58) Field of Classification Search ............ 455/404.1, 455/404.2, 421, 422.1, 414.1, 414.2, 456.1, 455/456.3; 701/200, 207, 213; 340/350, 340/352, 357.01, 357.06; 342/350, 450
See application file for complete search history.

(56) References Cited

U.S. PATENT DOCUMENTS 5,661,460 A 8/1997 Sallen et al.
6,202,023 B1 * 3/2001 Hancock et al. ............ 701/201
6,591,103 B1 * 7/2003 Dunn et al. ................. 455/436
6,639,516 B1 10/2003 Copley
6,907,224 B2 * 6/2005 Younis ...................... 455/12.1
7,013,148 B1 * 3/2006 Ganesh .................... 455/456.1
7,042,361 B2 5/2006 Kazdin et al.
2002/0098850 A1 * 7/2002 Akhteruzzaman et al. .. 455/456
2002/0115453 A1 8/2002 Poulin et al.
2002/0164993 A1 11/2002 Elliot
2003/0013449 A1 1/2003 Hose et al.
2003/0025602 A1 * 2/2003 Medema et al. ......... 340/568.1
2004/0002348 A1 * 1/2004 Fraccaroli ................ 455/456.3
2005/0070312 A1 * 3/2005 Seligmann et al. ...... 455/456.6

OTHER PUBLICATIONS

International Search Report and Written Opinion of the International Searching Authority, dated Aug. 31, 2006.

* cited by examiner

*Primary Examiner*—Jean Gelin
(74) *Attorney, Agent, or Firm*—Howard M. Gitten; Edwards Angell Palmer & Dodge LLP

(57) ABSTRACT

A method for identifying a physical location of a first automatic location identification (ALI) equipped wireless device by determining a geographic area based upon the identified physical location. In a next step, a server identifies at least a second ALI equipped wireless device located within the determined geographic area, and causes an identifier that identifies the second wireless device to be sent to the first wireless device. A user also can select the geographic region from a menu of regions. In either case, the user of the first ALI equipped wireless device can initiate communication with a user of the second wireless device, for instance using text messaging or by placing a voice call.

9 Claims, 14 Drawing Sheets

SYSTEM AND METHOD FOR EXCHANGE OF GEOGRAPHIC LOCATION AND USER PROFILES OVER A WIRELESS NETWORK

CROSS-REFERENCE TO RELATED APPLICATIONS

This Application is a Non-Provisional of Provisional (35 USC 119(e)) application 60/553,241 filed on Mar. 15, 2004.

BACKGROUND OF THE INVENTION

The inventive arrangements relate generally to wireless devices and more particularly to the use of wireless devices with automatic location identification capabilities for sending or exchanging user profile information.

In June 1996, the Federal Communications Commission (FCC) set in place a two-phase plan for implementing wireless 911 in the United States. Phase I, which was originally to have been implemented by April 1998, required callback numbers and cell site sector information about each incoming wireless 911 call. Cell phones that met the Phase I requirements provided a general indication of the caller's location, although the area may be as large as 100 square miles.

Phase II, which was originally scheduled to have been implemented by October 2001, required wireless carriers to provide automatic location identification (ALI) for each wireless 911 call. The plan included a requirement to provide wireless location accuracy for 95% of the callers within a radius of 150 meters or better. The Phase II portion of the plan was intended to enable improved emergency response in connection with 911 calls. The ALI technology necessary to implement Phase II has been delayed in many instances, but is now being deployed in various locations with the expected improvement in emergency response.

There are two basic methods by which wireless position information can be determined. One approach determines a cell phone position by measuring angle of arrival (AOA) and time of arrival (TOA) of cell phone signals at multiple fixed base stations. This approach is essentially a network-based solution. Still, there are a number of problems associated with such network-based solutions. These problems are mainly related to the vagaries of signal propagation, base station availability and infrastructure costs. An alternative approach makes use of the existing global positioning system (GPS) infrastructure. The GPS based approach incorporates a GPS system into each cell phone and relies upon the phone to determine its location for itself. GPS based systems have their own set of problems that mainly relate to GPS satellite acquisition and cold start delays.

The most advanced ALI systems are those that rely on a combination of both the network based and GPS based solutions. Such systems collect GPS measurements and network measurements and send the measurement data to the position determination entity. The position determination entity then processes the measurements to produce the most accurate location information based on available data.

Currently, ALI technology is commercially available from a number of different technology developers. For example, Qualcomm, Inc. of San Diego, Calif. and SnapTrack, Inc. of Campbell, Calif. offer commercially proven GPS-based positioning solutions for third generation wireless (3G). These systems are available for a variety of different air interfaces including CDMA and GSM. Further, they offer commercially available chipsets that can be integrated in cell phones. Also, rather than requiring modification of each base station, a database is constructed at a position determination entity that contains the precise location of each base station.

Aside from the obvious benefits ALI offers with regard to improving emergency responsiveness, the new technology has also created many opportunities for new and interesting applications that make use of the ALI data. These applications offer revenue-generating products and services that are of potential interest to a range of markets including entertainment, fleet management, and security.

BRIEF SUMMARY OF THE INVENTION

The invention concerns a method for identifying a physical location of a first automatic location identification (ALI) equipped wireless device, determining a geographic area based upon the identified physical location, identifying at least a second ALI equipped wireless device located within the determined geographic area, and propagating an identifier that identifies the second wireless device to the first wireless device. In another arrangement, a user can select the geographic region from a menu of regions. In either case, the user of the first ALI equipped wireless device can initiate communication with a user of the second wireless device, for instance using text messaging or by placing a voice call.

DETAILED DESCRIPTION OF THE INVENTION

The present invention relates to a method that facilitates the introduction of people using wireless communication devices, for instance mobile telephones. Moreover, the present invention also facilitates communication between pools of users having matching profiles. In particular, a user profile can be received from a first wireless device user and the location of the wireless device can be determined using an automatic location identification (ALI) system. The user profile can be compared to profiles of other wireless device users within the same geographic region as the first user, or other users within a user selected geographic region. A listing of users having matching profiles then can be presented to the first user, for example on the display of the wireless device. The first user then can contact other users selected from the list, for instance using text messaging or by placing a voice call. Individuals within a profile group also can select a privacy feature which blocks incoming messages from other users within the profile group.

Figure 1:
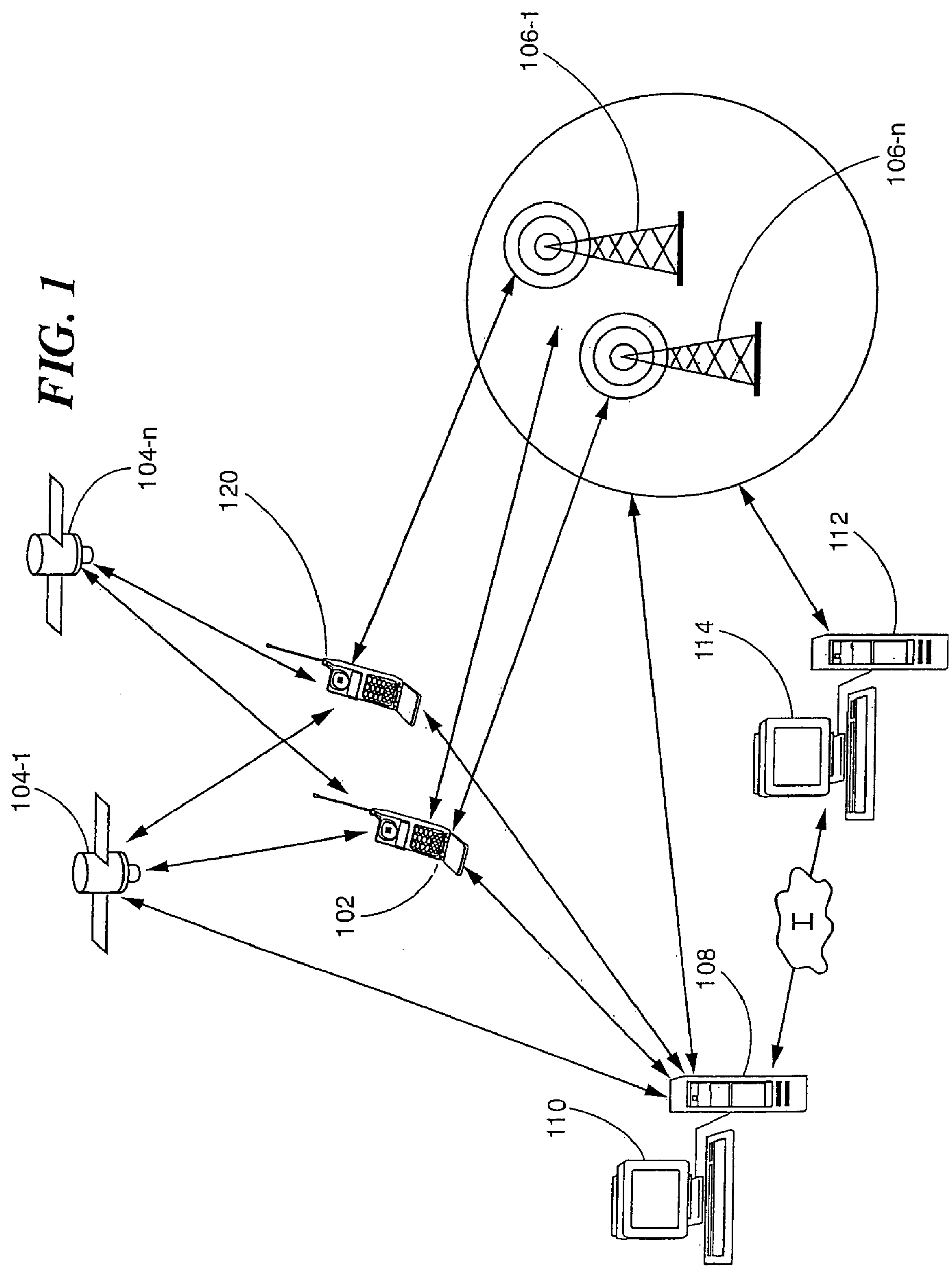
FIG. 1 is a schematic drawing showing the operation of a wireless automatic location identification (ALI) system in accordance with the invention.

FIG. 1 is a drawing that is useful for understanding the operation of a wireless automatic location identification system in accordance with the inventive arrangements. As illustrated therein, an ALI device can rely on a combination of both network based and GPS based solutions. Such systems collect GPS measurements and network measurements and send the measurement data to a position determination entity. A server utilizing either method alone or both in combination, can then process the measurements to produce the most accurate location information based on available data.

More particularly, FIG. 1 shows that a conventional network based ALI solution can automatically identify a physical location of a wireless device 102 or 120 by measuring angle of arrival (AOA) and time of arrival (TOA) of cell phone signals at multiple fixed base stations 106-1, **106-*n*. The wireless devices 102, 120 can be a wireless PDA, cellular phone, laptop computer, or any other device incorporating suitable processing and communication circuitry. The fixed base stations 106-1, 106-*n* can be in communication with a server 108, which can calculate a physical location of the wireless device 102**. For example, the physical location can be calculated based on AOA and TOA information.

The server 108 can communicate with the base stations 106-1, **106-*n* using any suitable means. For example, a conventional telephone network, high-speed data line, wireless link, or a combination of the foregoing can be used. Base stations 106-1, 106-*n* can provide a data link between the wireless device 102 and the server 108. The server 108 can be controlled by a workstation 110** or similar user interface device.

Due to the vagaries of signal propagation, base station availability and other infrastructure limitations, the physical location determined using the network-based solution can be inaccurate in certain instances. In order to improve overall accuracy, the network-based approach can also generate location information for the wireless device 102 using an alternative approach. For example, the wireless device can include an onboard global positioning system (GPS) and associated processing circuitry/software. The GPS system can be incorporated into each wireless device 102, 120 and such system can use signals from a plurality of GPS satellites 104-1, **104-*n* to independently determine the physical location of the device. The GPS based location information thus obtained can be forwarded to the server 108 through the one or more base stations 106-1, 106-*n*. Likewise, server 108 can communicate location information to an emergency or 911 services operator. The ALI data provided by the server can be highly accurate data regarding the location of the wireless device 102, 120** based on a combination of the network data and GPS data.

Either server 108 or an application server 112 has a database associated therewith. The database stores at least coordinate map data such as that provided by NAVTEQ, MapQuest or the like. Such map data may be used to identify a geographical location and to provide a graphical map at a display such as at a computer display, or display (to be discussed below) of a wireless device. Furthermore, points of interest and their associated geographical locations, as a function of longitude, latitude or street address are stored as part of the database and may be overlaid on the coordinate map data.

For the purposes of the present invention, the precise manner by which ALI information is determined is not critical. The system can rely primarily on GPS, network measurements or a combination of the two. Accordingly, the foregoing description represents merely one possible method by which such ALI can be determined. Other methods are also possible and are also intended to be within the scope of the invention.

Figure 2:
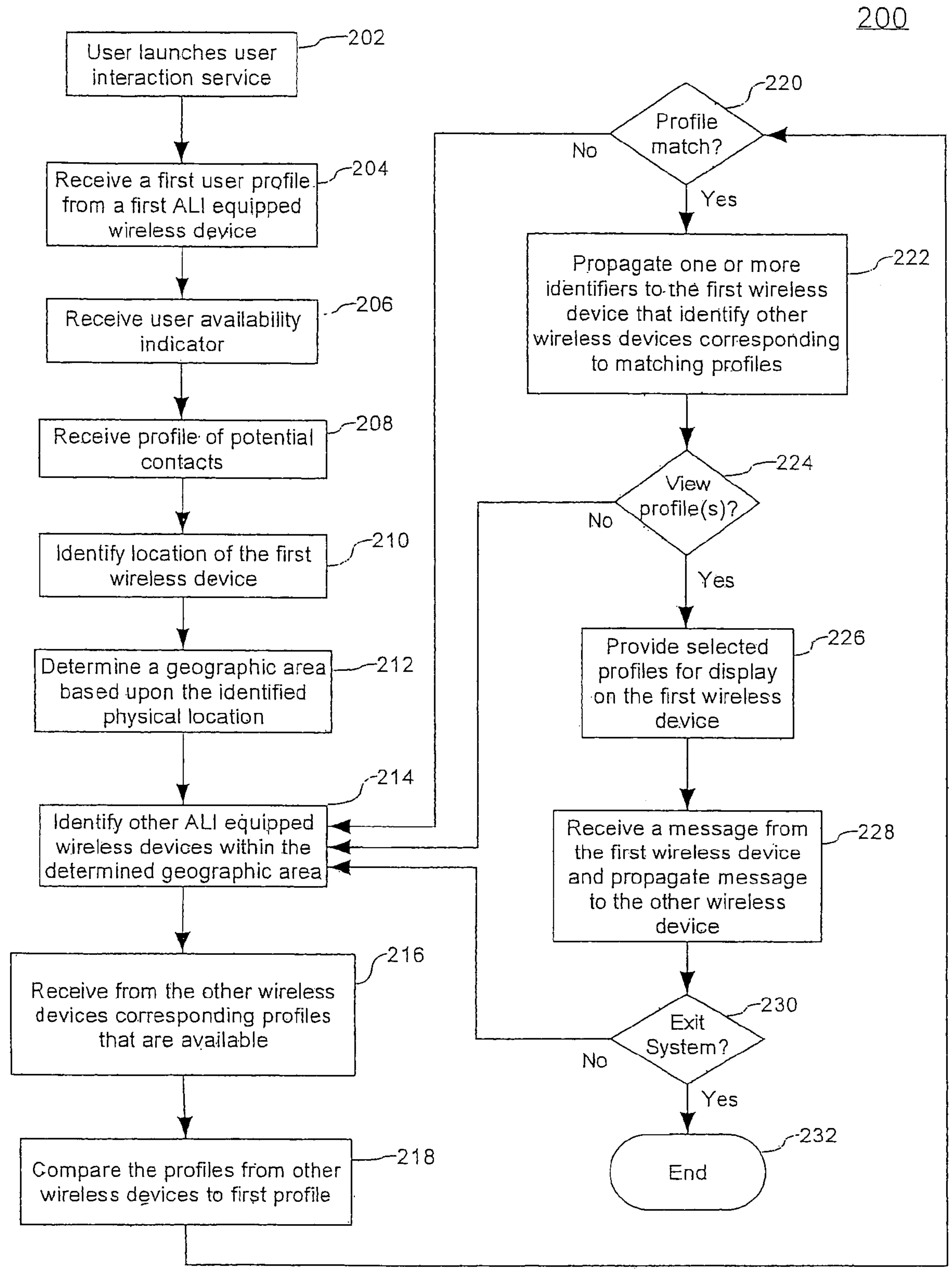
FIG. 2 is a flow chart of the process of transferring profiles for meetings in accordance with the invention.
Figure 4:
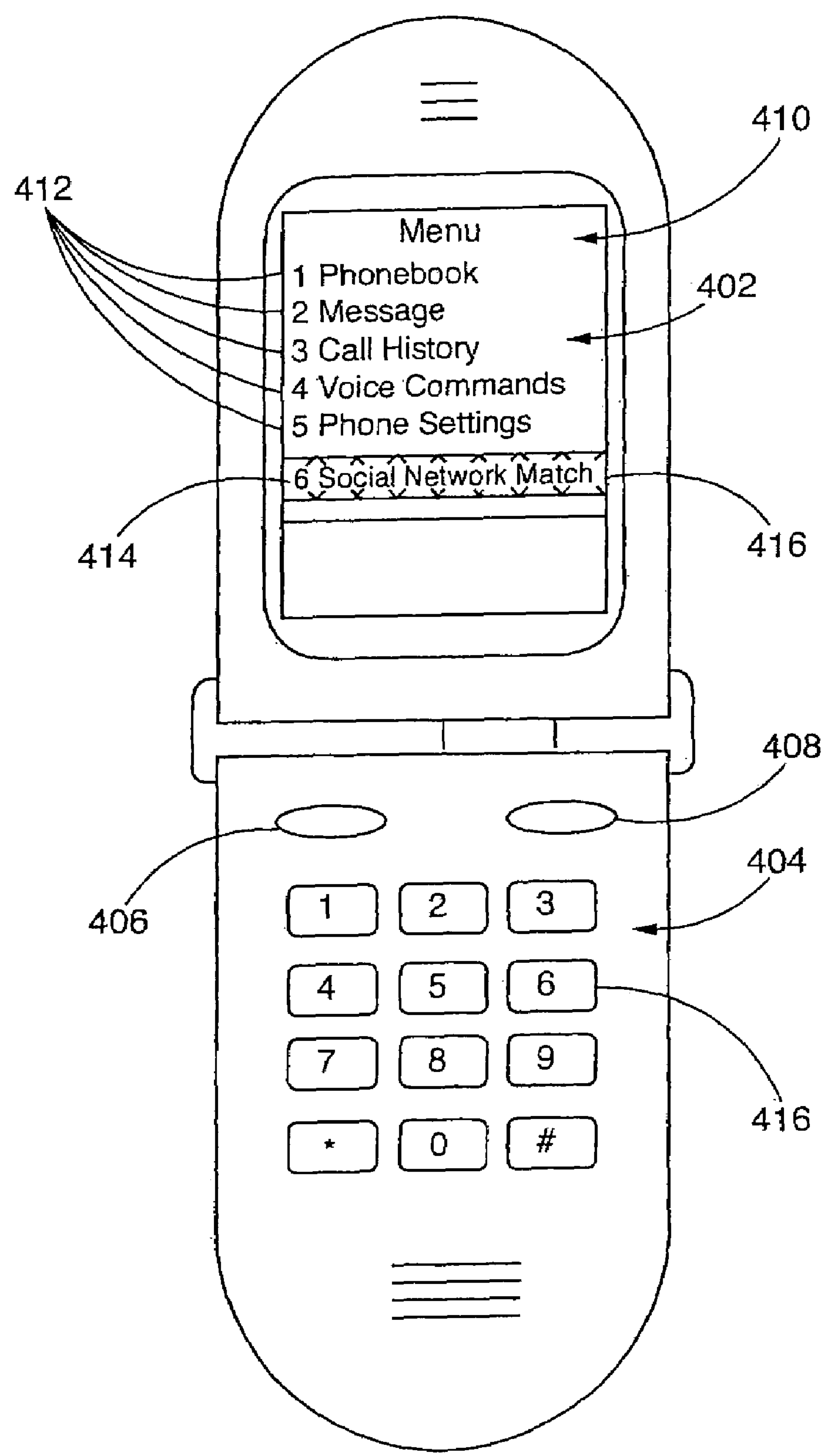
FIG. 4 is a front elevation view of a wireless device in accordance with the invention.

FIG. 2 is a flow chart 200 that is useful for understanding the process of the present invention. The process in FIG. 2 can begin in step 202 when a server receives a user request to launch a user interaction service from the first ALI equipped wireless device (first wireless device) 102. Step 202 can be better understood with reference to FIG. 4. FIG. 4 shows the wireless device 102, a cellular phone, as shown in the preferred non-limiting example, which can have a display 402, a keypad 404, and menu navigation keys 406, 408. The display 402 can be a touch screen display or any other type of display which can present a graphical user interface. Such screens are known to the skilled artisan.

Figure 5:
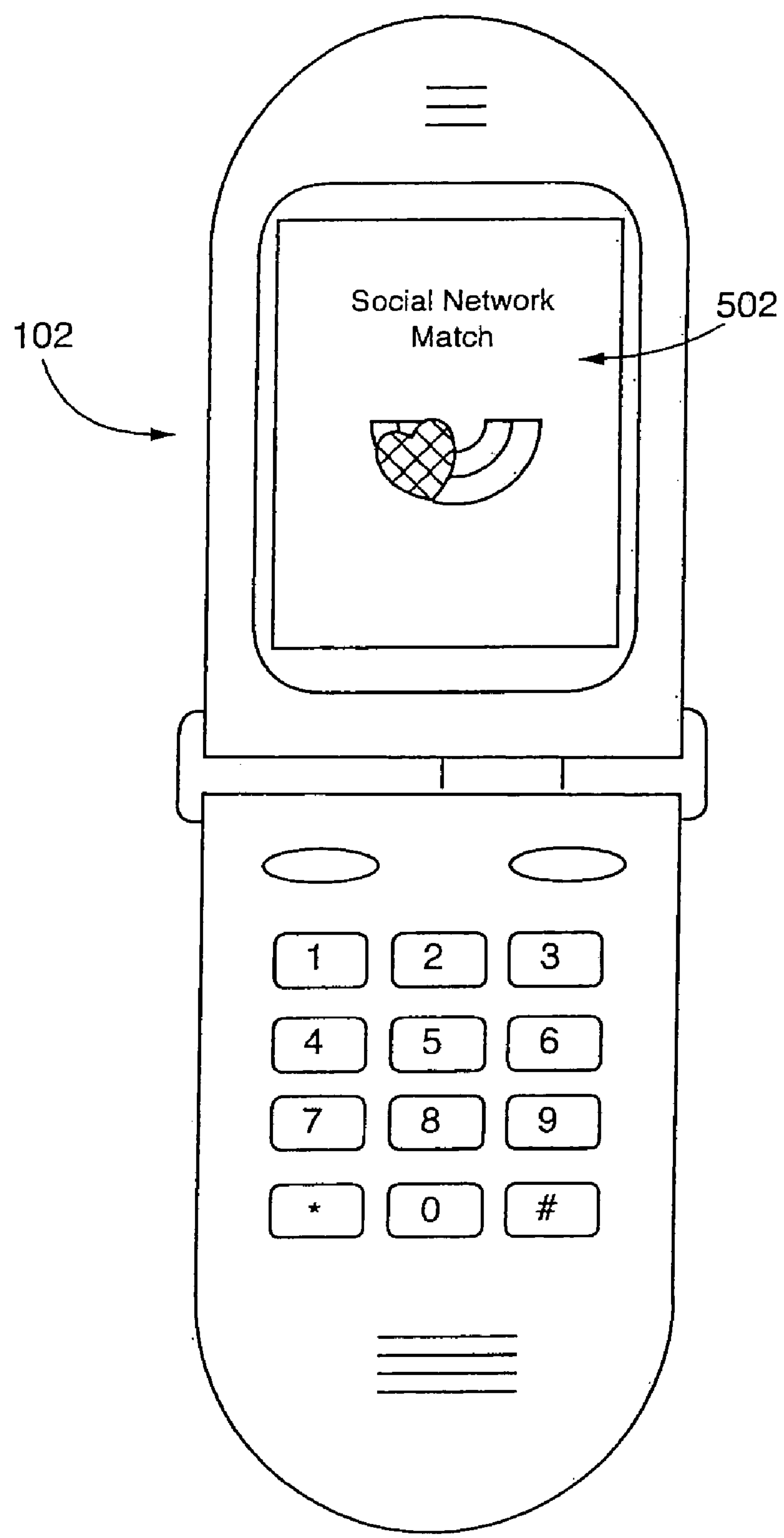
FIG. 5 is a front elevation view of a wireless device showing a second screenshot in accordance with the invention.

In one arrangement, the display 402 can present to a user a menu 410 including selectable icons 412 that can be selected using a touch key controlled cursor or by touching the display with a stylus or human appendage, such as a finger. In another arrangement, the menu navigation keys 406, 408 can be used to navigate the menu 410 and make a menu selection. In yet another arrangement, each icon 412 in the menu 410 can be identified with a number 414 identifying a corresponding key number corresponding to a key 416 on the keypad 404. In any case, the process can begin in step 202 by a keystroke or touching of the touch screen display 402 to launch the user interaction service. One icon 416 from the menu 410 can be associated with the user interaction service. When launch of the user interaction service commences, a welcome screen 502 may be displayed, as shown in FIG. 5.

Proceeding to step 204 of the flowchart 200 in FIG. 2, the server 112 can receive the user profile (first user profile) from the wireless device 102. The user profile can be entered once, and then used by the server each time the user profile is needed. The user profile can be edited by the user when desired. Multiple user profiles also can be created either on wireless device 102 or at server 112.

In one arrangement, entry of the user profile can be used to log a user into application server 112. However, the invention is not limited in this regard and other processes can be implemented by which the user can log into the server. For instance, a user identifier and password can be provided to server 112.

Figure 6:
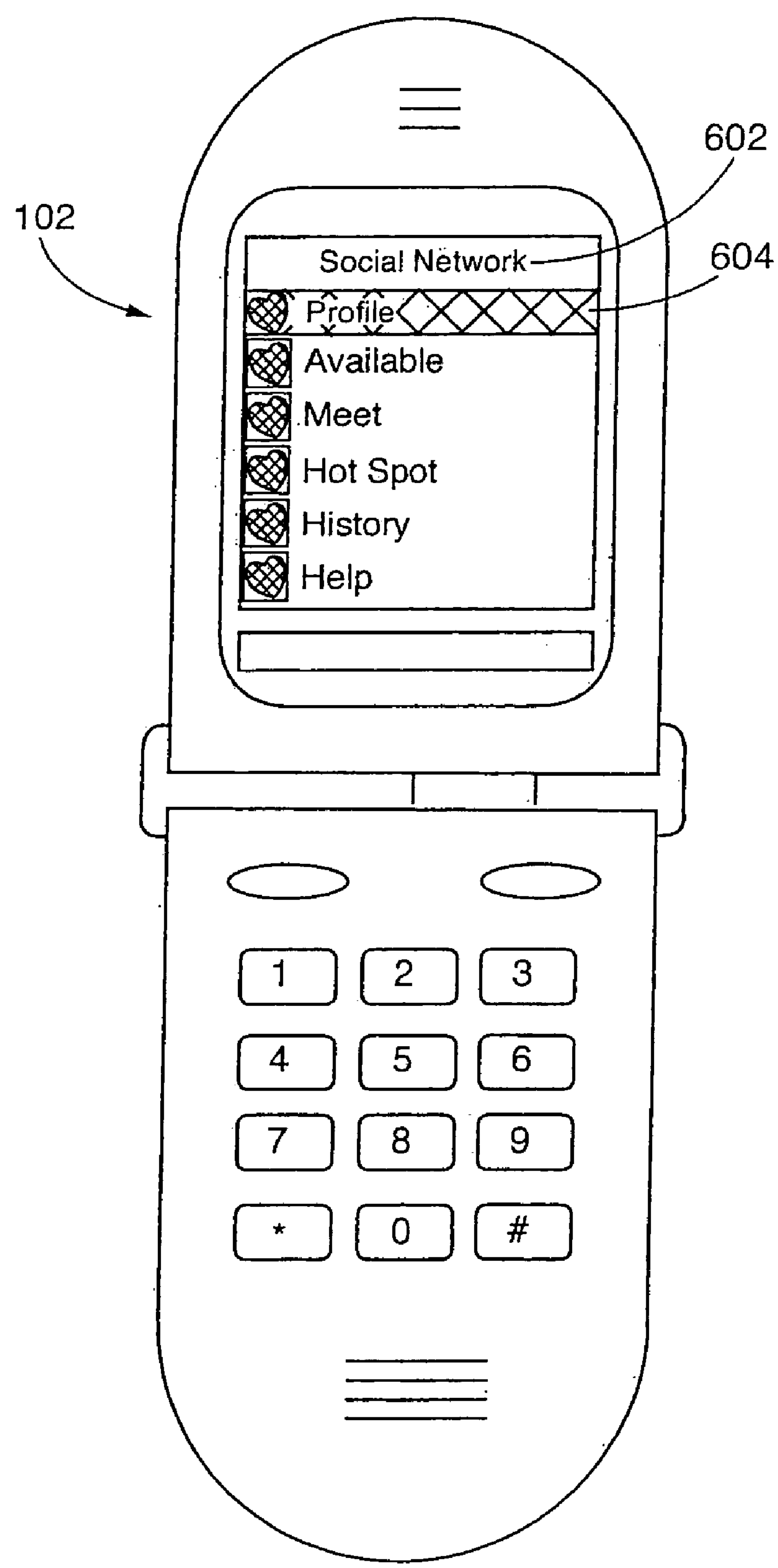
FIG. 6 is a front elevation view of a wireless device showing a third screenshot in accordance with the invention.
Figure 7:
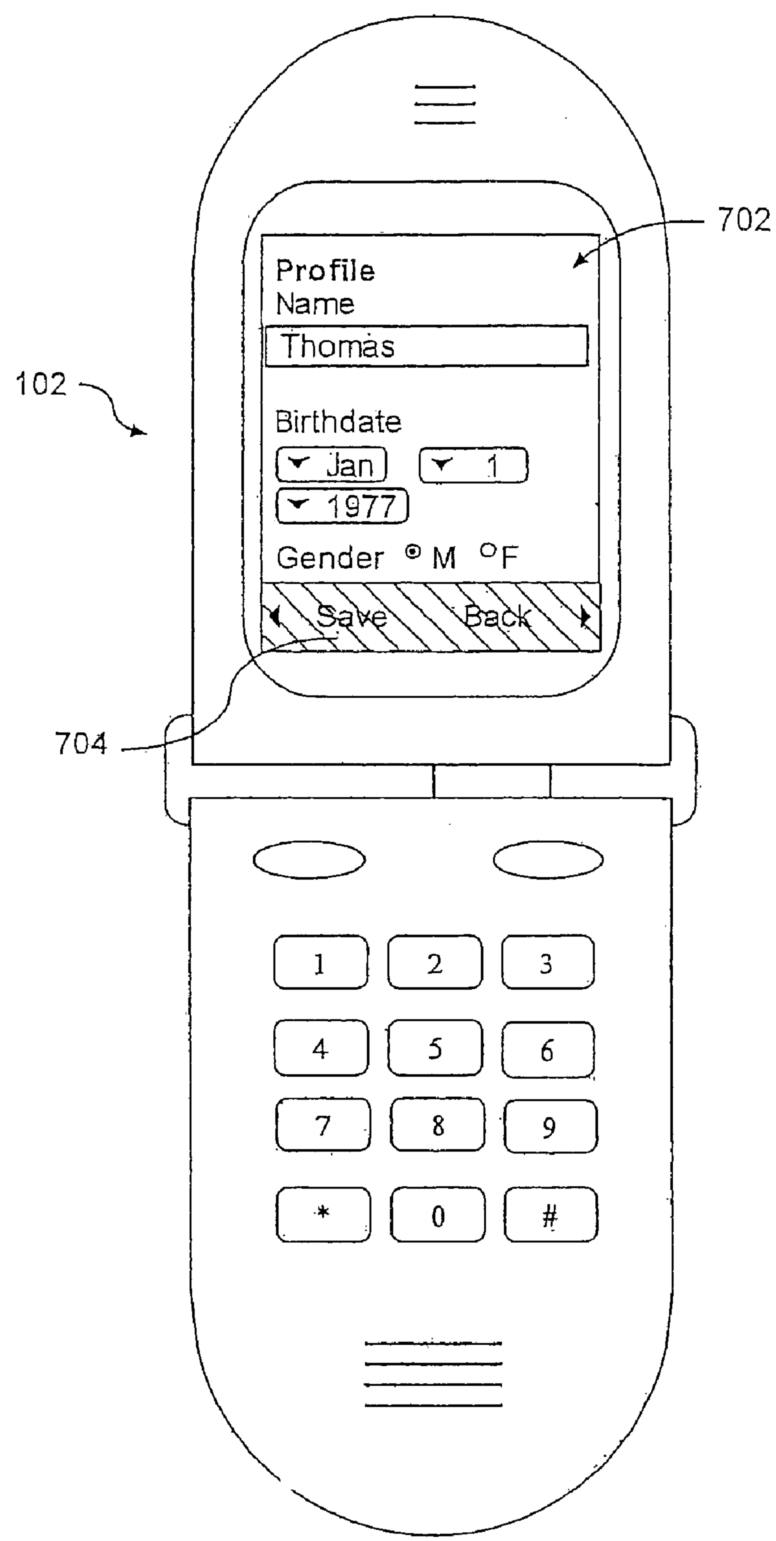
FIG. 7 is a front elevation view of a wireless device showing a fourth screenshot in accordance with the invention.

Step 204 can be better understood by making reference to FIGS. 6–7. FIG. 6 shows a user interaction service menu 602 that can be provided. The user can enter a user profile by selecting a profile option 604, which can initiate presentation of a user profile screen 702, as shown in FIG. 7, through which the user can enter his or her profile information. In one arrangement, the profile can be a profile of the user including information such as user name, age, gender, date of birth, race, sexual orientation, hair color, eye color, height, weight, smoking habits, drinking habits, picture, personal interests and/or any other type of user information. The profile may also include a picture or video captured by the wireless device. The entered user profile can be saved using a "Save" option 704. When the "Save" option 704 is selected, the wireless device 102 can transmit the user profile information to the server 112. Alternatively, the profile can be stored locally at wireless device 102 and transmitted at a later time.

Continuing to step 206, server 112 then also can receive a user availability indicator from wireless device 102. For instance, server 112 can receive a time duration for which the user is available. Both the user profile and the availability indicator can be saved to a storage location, for instance to a database associated with server 112 or at wireless device 102.

Figure 8:
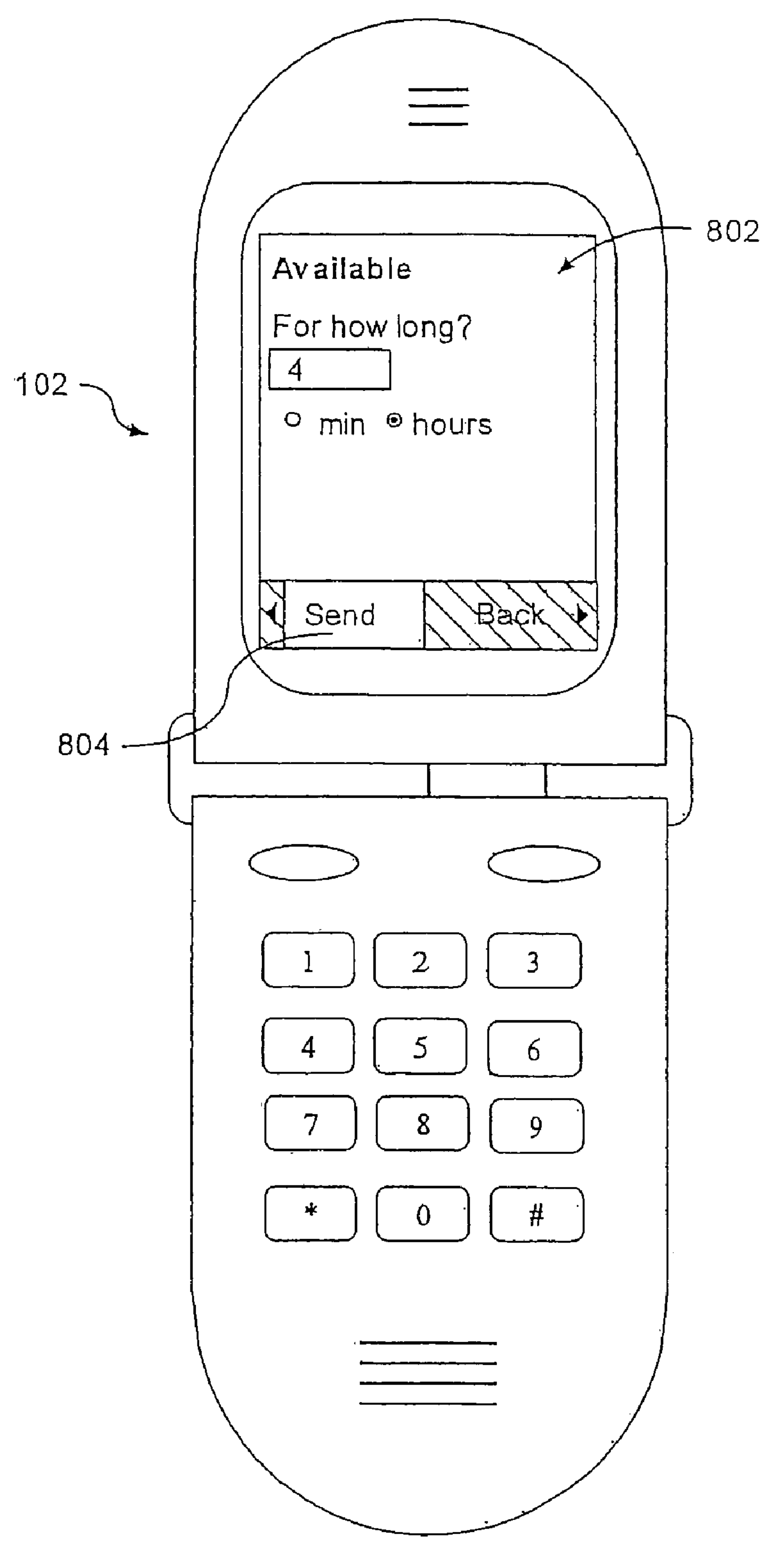
FIG. 8 is a front elevation view of a wireless device showing a fifth screenshot in accordance with the invention.

Step 206 can be better understood by making reference to an availability screen 802 shown in FIG. 8, through which the user can indicate his or her availability to interact with other users. The availability screen 802 can prompt the user for a length of time that the user will be available. Alternatively, the availability screen 802 can prompt the user for one or more time slots in which the user will be available. Still, there are other ways in which the user can indicate his or her availability, and the invention is not limited in this regard. Once the user availability information is entered, the user can select a "Send" option 804 to transmit the user availability information from wireless device 102 to server 112. If not already transmitted, the user profile can be transmitted at this time as well. If an error occurs in any of the transmissions or server 112 is not otherwise able to respond to a message reception with a confirmation, an error message can be presented on the display 402. If a confirmation is received from server 112, the confirmation can be presented to the user.

Figure 9:
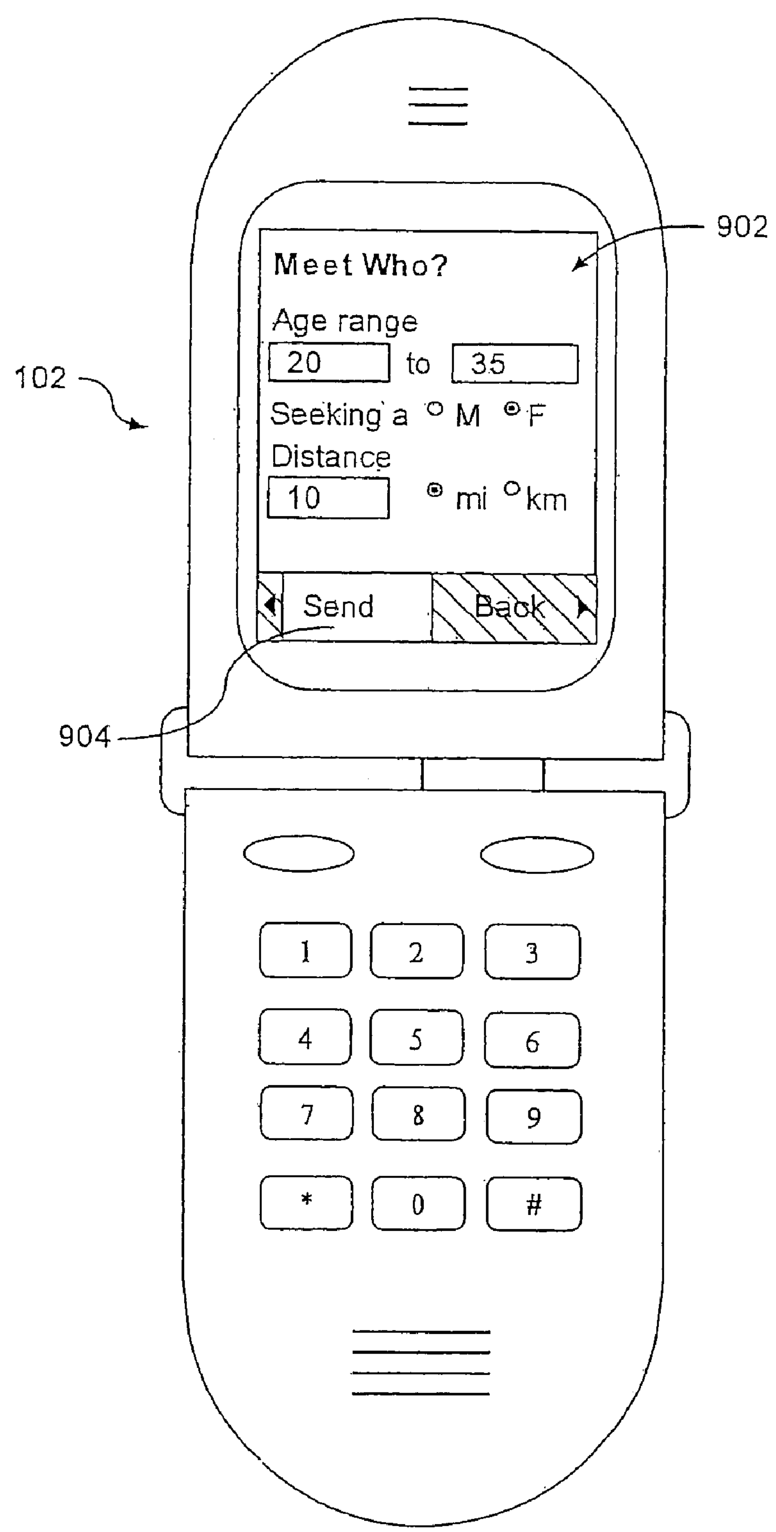
FIG. 9 is a front elevation view of a wireless device showing a sixth screenshot in accordance with the invention.

Proceeding to step 208, server 112 can receive a user-determined profile (desired traits) of potential contacts from wireless device 102. The profile of potential contacts can be a profile (contact profile) of people that the user may be interested in contacting. For instance, the contact profile can include information such as age range, gender, current proximity to the user, or any other type of contact information that can be specified. A contact profile screen 902 that is useful for understanding step 208 is shown in FIG. 9. The screen can prompt the user to enter desired contact information. Again, a send option 904 can be used to transmit the data to the server.

Proceeding to step 210, the location of the first wireless device can be identified as discussed above. Continuing at step 212, a geographic area then can be determined based upon the identified physical location. The geographic area can be, for example, an area within a specific radius of the identified location, an area of a specified type of commerce that is proximate to the identified physical location, or any other geographic area that can be defined with respect to the identified physical location of the first wireless device 102. For instance, the geographic region can be an area having a specified density of restaurants and/or nightclubs that is within a specified distance from the identified physical location.

Referring to step 214, a physical location of at least a second ALI equipped wireless device, such as a second wireless device 102, can be identified within the determined geographic area by server 108. Application server 112 can receive available profiles from the other wireless devices 120, as shown in step 216. For instance, server 112 can receive profiles from the other wireless devices 120 in which a user profile has been entered and a user has indicated that the user is currently available. In one arrangement, a database can be provided at application server 112 in which a plurality of user profiles are stored, for example as records. In such a case, the user profile record associated with a particular user can be updated to indicate when the user is logged into the system, logged off of the system, when the user is currently available, and the privacy settings currently selected for the user.

Continuing at step 218, server 112 compares the first user profile and/or the profile of potential contacts entered by the user to the profiles of other users such as the profile associated with at least a second wireless device 120. For instance, the profiles received from the other wireless devices 120 can be compared to the potential contact profile received from the user (wireless device 102), and potential contact profiles received from the other wireless devices 102 can be compared to the first user profile. Profile matches can be defined in any number of ways. For example, a total profile match can be defined when the profiles of at least two users match each other's potential contact profiles. A partial profile match can be defined if a first user profile matches a second user's potential contact profile, but the second user's profile does not match the first user's potential contact profile. Still many other options can be provided. For example, a rating system can be implemented to rate how closely the first user matches the second user's potential contact profile, and so on. Numbers and/or graphical indicators can be provided to show a potential contact rating. Server 112 can be programmed only to forward profiles having a rating above a predetermined value.

In the case that a plurality of user profiles are stored in a database, server 112 performs database operations on the plurality of user profiles to select a pool of matching profiles when a profile match is required. In such an arrangement, fields can be provided for each record that identify when particular users are logged into the server, logged off the system, when the users are currently available, and the privacy settings currently selected for the users. A query or report then can be used to select matching profiles of users meeting certain criteria, for example, users that are logged into the server, are currently available, and have certain profile characteristics. Such database operations are known to the skilled artisan.

Figure 10:
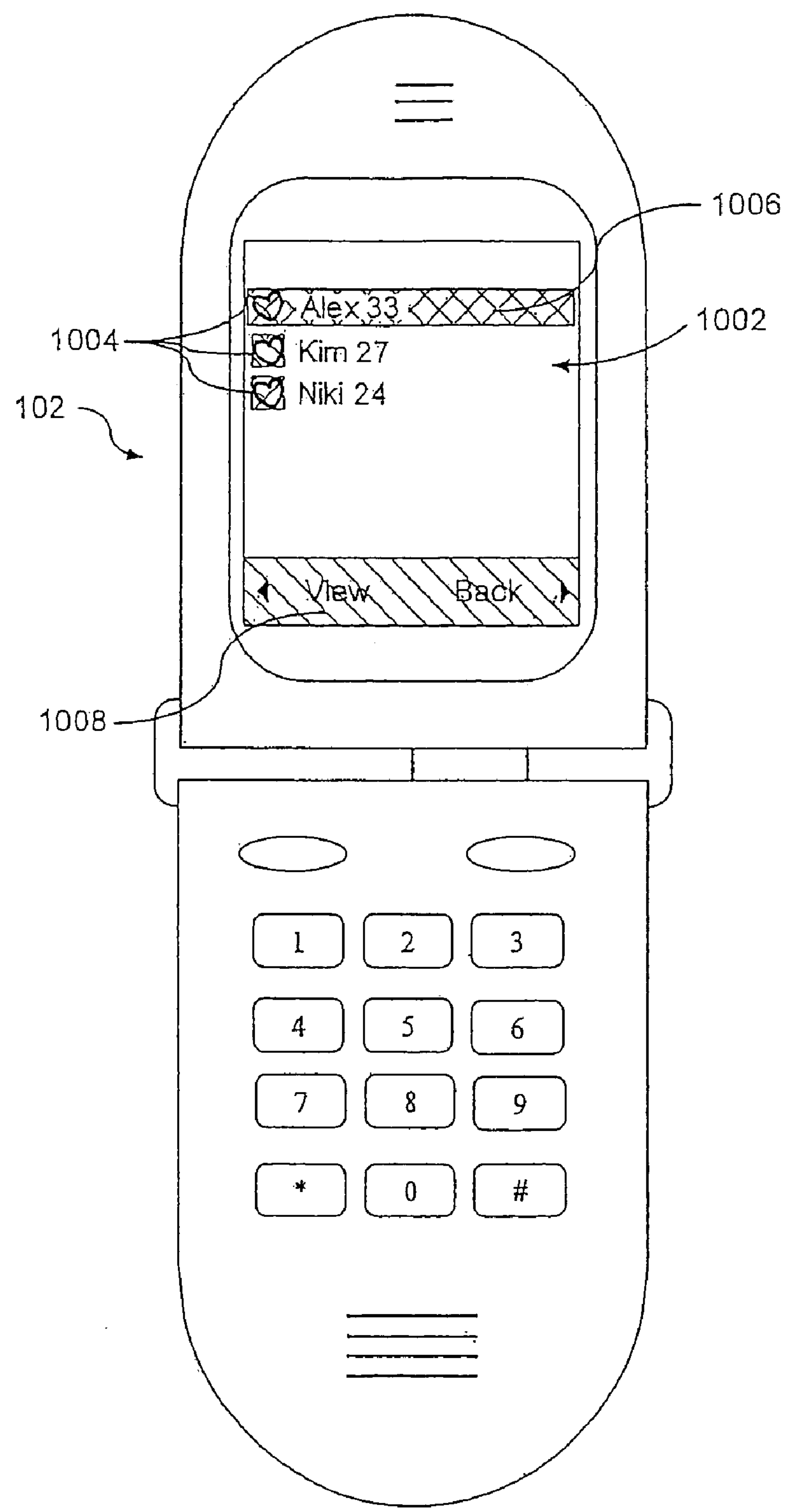
FIG. 10 is a front elevation view of a wireless device showing a seventh screenshot in accordance with the invention.

Referring to step 220, if no profile matches are found, the method can revert to step 214 and identification of other ALI equipped wireless devices can continue. If profile matches are found, however, the method can continue to step 222 in which one or more identifiers corresponding to stored profiles are transmitted by server 112 to the first wireless device 102 to identify other users that correspond to the matching profiles. For example, the other users can be identified by user names, nicknames, or any other suitable identifiers. The identifiers can be displayed on the first wireless device 102, which may include some salient characteristics such as age or match index as discussed above. Step 222 can be better understood by making reference to a contact list 1002, shown in FIG. 10, which contains the listing of identifiers 1004 that correspond to the matching profiles. In the instance that certain users have selected privacy settings to block incoming messages from other users within the profile group, an icon can be presented next to their respective identifiers to indicate that their privacy settings are active. In another arrangement, the server 112 can refrain from sending the identifiers of such users.

Referring to step 224 and step 226, if the user elects to view the profiles of potential contacts, the profiles can be provided for display on the first wireless device 102. The profiles can be transmitted to the first wireless device 102 when the identifiers are transmitted or after the user selects an option to view the profile of a potential contact. Again making reference to FIG. 10, the user can select a particular potential contact 1006 and select a view option 1008 to view the associated contact information. Nonetheless, the invention is not limited in this regard and the user can view the profile of the potential contact in any other suitable manner.

Proceeding to step 228, a user of the first wireless device can choose to send a message from wireless device 102 to one or more selected wireless devices 120. The server 112 can receive the message and propagate the message to the selected wireless devices such as wireless device 120. Or, in another arrangement, the message can be propagated directly to the selected wireless device 120 from the first wireless device 102. Users of the first wireless device 102 and the selected wireless device (120) then can communicate with each other via text messages. Voice communication links also can be established between the wireless devices 102, 120. In one arrangement, the voice communications can be established by selecting user identifiers from the contact list 1002, while the actual telephone numbers, making up part of the profile, associated with the user identifiers 1004 is masked from the first user.

Nevertheless, the identification of other ALI equipped wireless devices 120 within the determined geographic area can continue while the user remains logged into the server 112, by repeating step 224, step 230 and step 214. The process can end when a user exits the system, as shown at step 232.

It should be noted that the above description of the invention was described utilizing two distinct servers, a server 108 for determining the geographical location of the wireless devices 102, 120 and an application server 112 utilized to perform the profile operations. However, it is within the scope of the invention for a single server to perform all functionality within the system.

Figure 3:
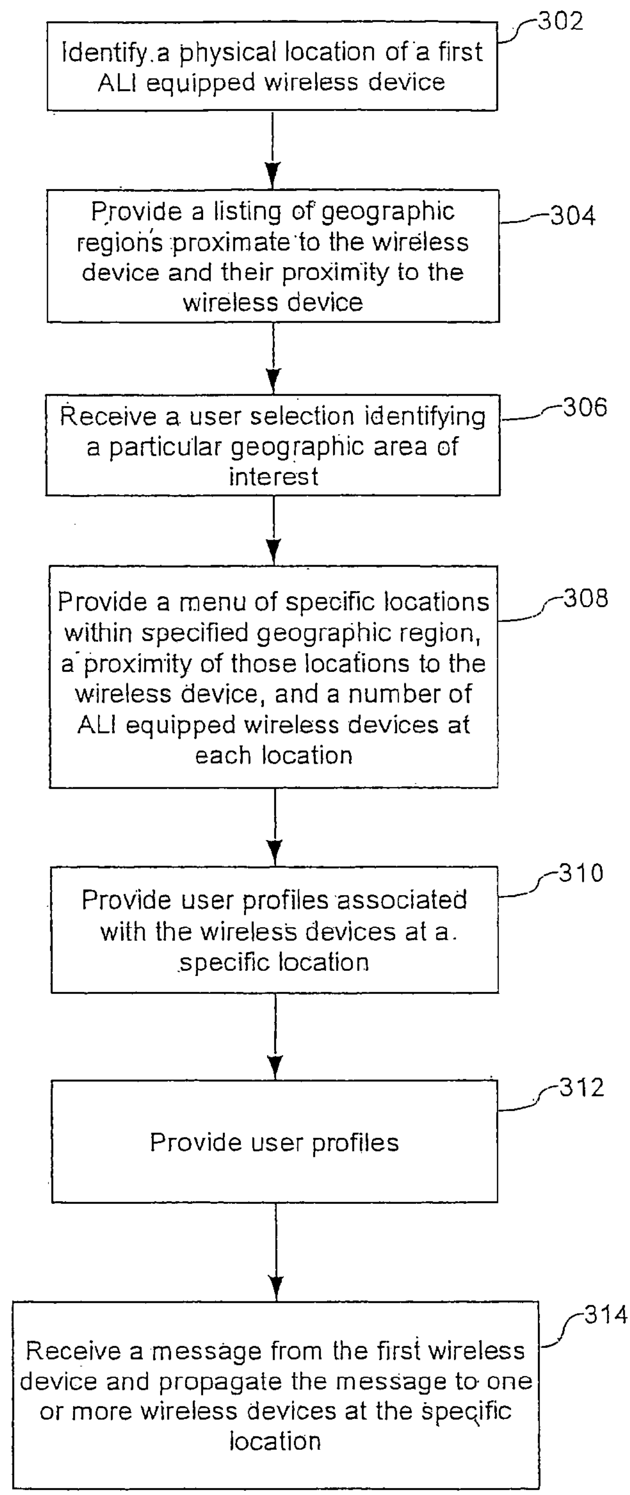
FIG. 3 is another flow chart of the process of transferring profiles for meetings in accordance with the invention.

Reference is now made to FIG. 3 which is a flow chart 300 that is useful for understanding another aspect of the process of the present invention. Referring to step 302, a physical location of a first ALI equipped wireless device 102 (first wireless device) can be identified. Proceeding to step 304, application server 112 can provide to the wireless device 102 a listing of geographic regions proximate to the wireless device 102. The server 112 also can provide a proximity indicator of each location indicating the distance of the geographic regions from the wireless device 102, by utilizing the coordinate map database and comparing the geographical location to the location of the geographic region and determining the distance. In one arrangement this process can commence after server 112 receives a request from the first wireless device 102 to provide the location information. For example, a specific key or screen option can be provided on the wireless device for such a request.

Figure 11:
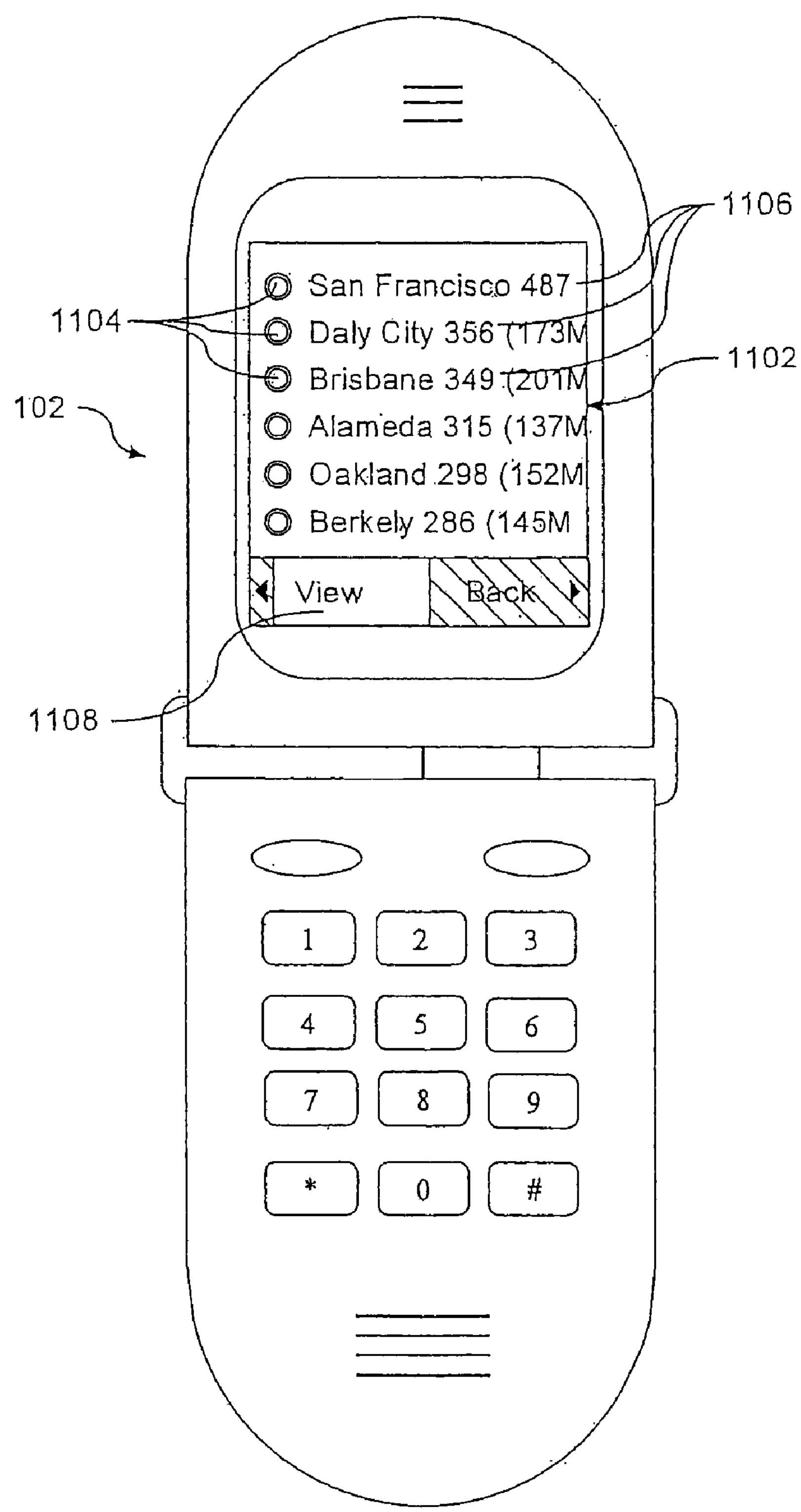
FIG. 11 is a front elevation view of a wireless device showing an eighth screenshot in accordance with the invention

Identifiers representing the identified locations can be displayed on the first wireless device 102. A location identifier screen 1102 that is useful for understanding step 306 is shown in FIG. 11. The location identifier screen 1102 can include a menu of geographic regions 1104. For each geographic region 1104, a proximity indicator 1106 can be provided.

Figure 12:
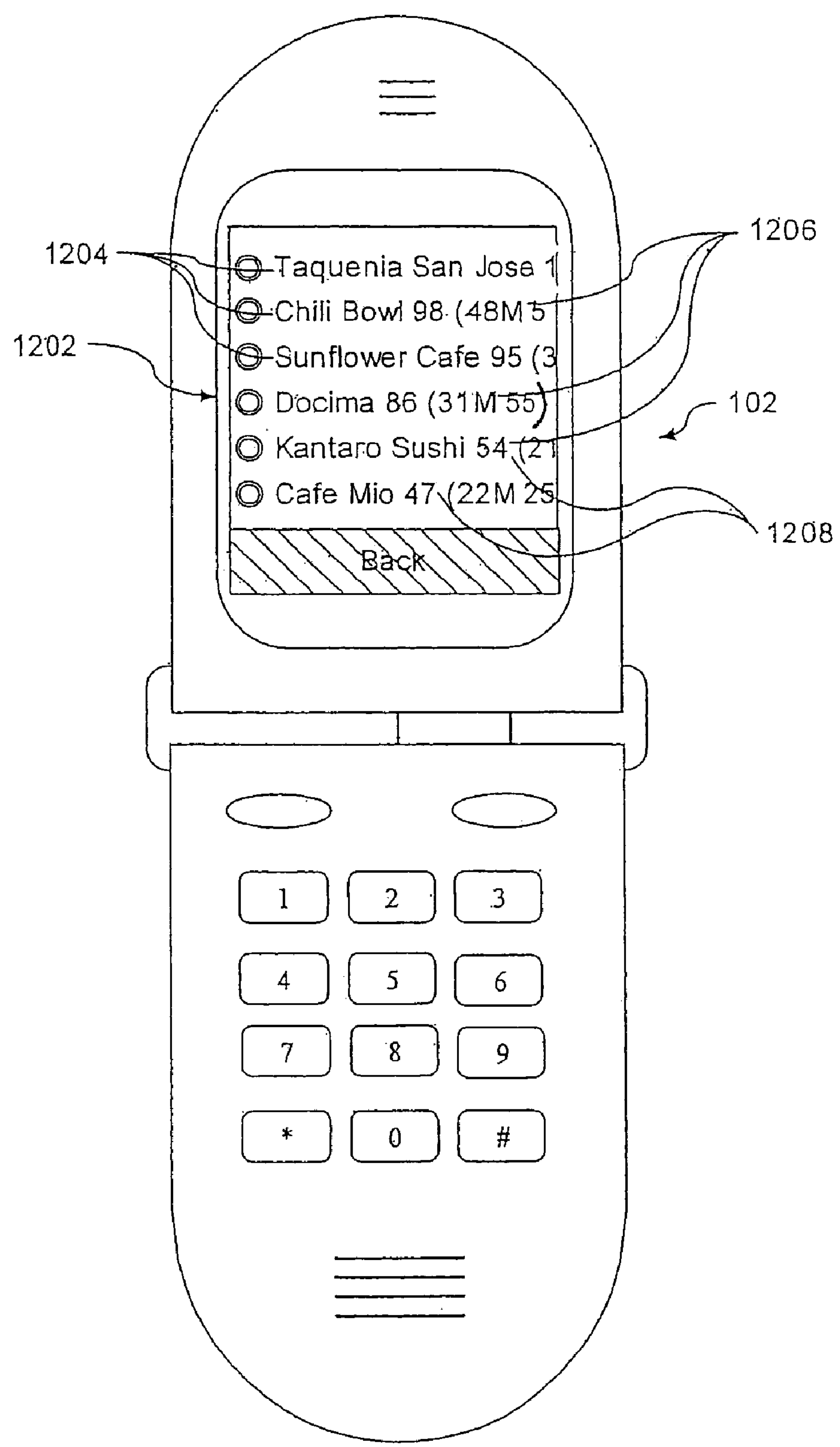
FIG. 12 is a front elevation view of a wireless device showing a ninth screenshot in accordance with the invention.

Proceeding to step 306, the server can receive a user selection identifying a particular geographic area 1104 of interest. Again making reference to FIG. 11, the user can make the selection by choosing the particular geographic area 1104 of interest from the menu and selecting a view option 1108. Responsive to the user selection, server 112 can compare locations and utilize its database, provide a menu of specific locations within the specified geographic region, and again determine a proximity of those locations to the wireless device 102, and a number of ALI equipped wireless devices within each location, as shown in step 308. A location information screen 1202 which is useful for understanding step 308 is shown in FIG. 12. The location information screen 1202 can include a menu of specific locations 1204, such as nightclubs, restaurants, or other places of interest, along with indicators 1206 of their proximities to the wireless device and indicators 1208 of the number of ALI equipped wireless devices at the respective locations. From this menu a particular location can be selected by the user.

Continuing to step 310, identifiers associated with the other ALI equipped wireless devices that are at the selected location can be provided to the first wireless device 102 in a manner discussed above. In one arrangement, the list can be limited to those users having profiles that match the first user's profile, as previously described. The user profiles associated with the wireless devices at the location can be made available for the user to peruse, as shown in step 312. Referring to step 314, the server 112 can receive a message from the first wireless device 102 and propagate the message to one or more wireless devices 120 at the selected location. As previously noted, the message can be propagated directly to the selected wireless devices 120 from the first wireless device 102. A messaging session then can be established among two or more users. Voice communications between users also can be established in a cellular phone embodiment.

Figure 13:
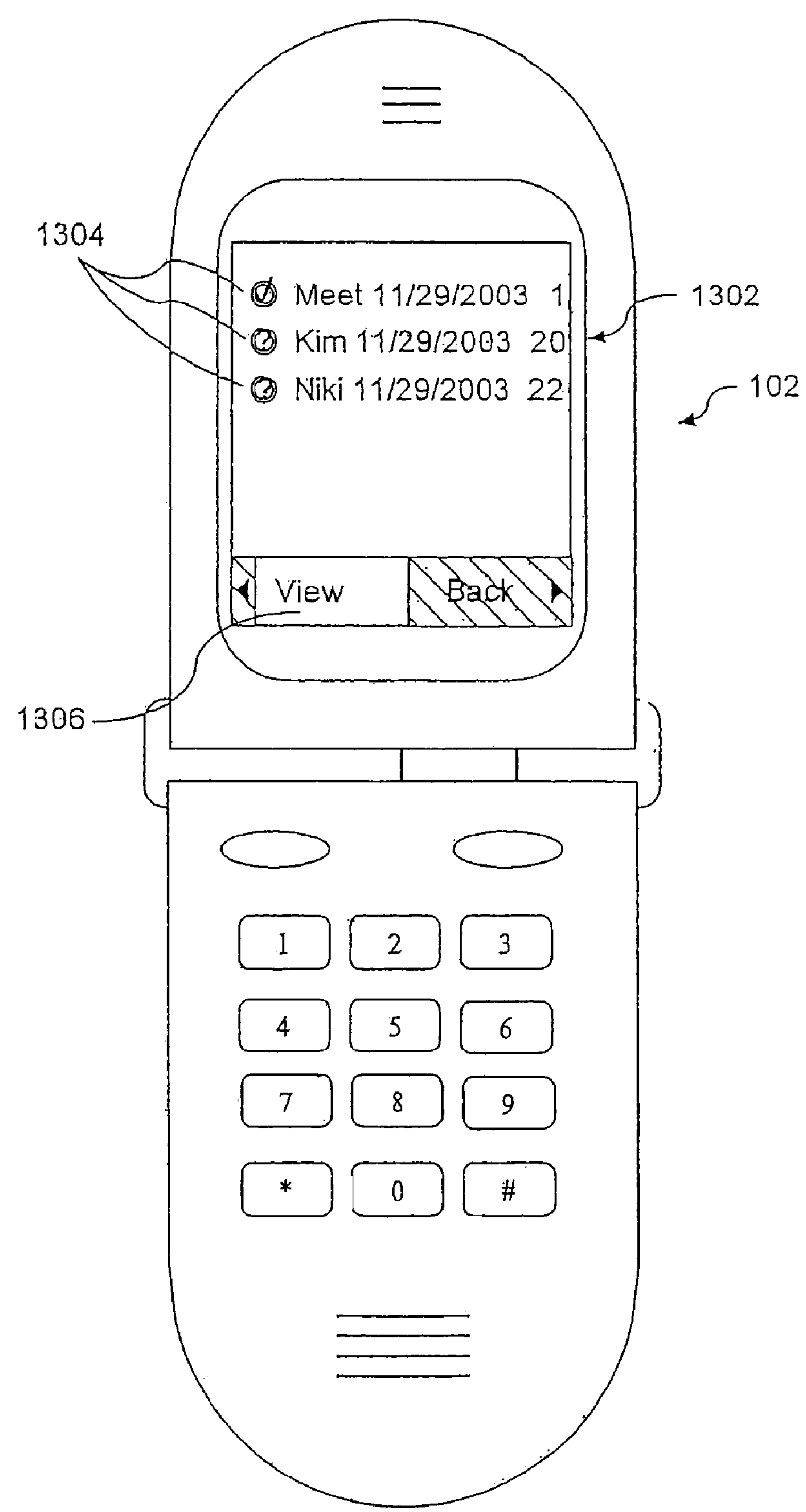
FIG. 13 is a front elevation view of a wireless device showing a tenth screenshot in accordance with the invention.

As communications are processed by server 112, server 112 can track activity and store a history of user interaction in a database. Similarly, a limited calling history can be stored at wireless device 102. Referring to FIG. 13, a history screen 1302 can be presented to the user displaying a list of all results and requests 1304 made on the wireless device 102. In one arrangement the list can be presented in chronological order. Details of the results and requests 1304 can be presented when the user selects the view option 1306.

Figure 14:
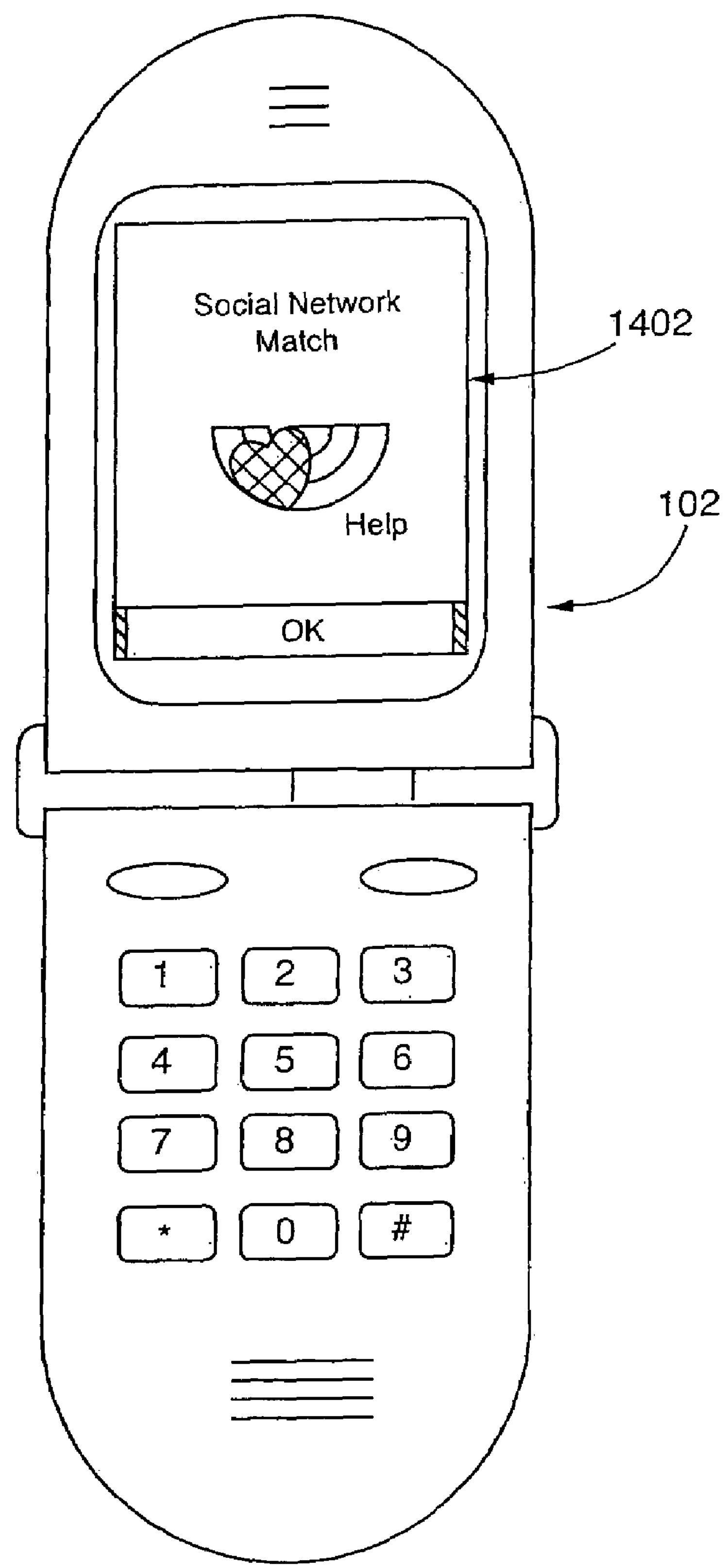
FIG. 14 is a front elevation view of a wireless device showing an eleventh screenshot in accordance with the invention.

Referring to FIG. 14, a help menu 1402 can be presented to the user. The help menu can provide instructions for using the wireless device and/or using the user interaction system. Help menus are known to the skilled artisan.

The above embodiment contemplates a "dating service" application. However, the method and system can be used for any matching of people having traits which can be compared. For example, one user who is walking their dog could identify other dog walkers with compatible dogs and routes and their geographic proximities. A user could store a tennis profile including skill and level and availability time to allow contact with others of like skill and availability within a geographical area to arrange a match.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims. For example, many of the functions described herein as being performed by the server can be performed directly at the wireless device. For instance, profile comparisons can be performed by the wireless device and data can be communicated directly between the first wireless device and other wireless devices. Still, there are many other functions that the wireless device can perform.

What is claimed as new and desired to be protected by Letters Patent of the United States is:

1. A system for sharing user profile information across a wireless network comprising:

at least a first automatic location identification equipped wireless device;

at least a second automatic location identification equipped wireless device;

a server, said server in communication with said first wireless device and said at least second wireless device for determining a physical location of said first wireless device and said at least second wireless device, determining a geographic area based upon the physical location of said first wireless device, identifying each said at least second wireless device located within the determined geographic area, causing an identifier that identifies said at least second wireless device to be sent to the first wireless device,said server identifying at least one specific location within the geographic area and identifying a number of at least second wireless devices located at the specific location, and providing information regarding the identified number of at least second wireless devices to the first wireless device.

2. The system of claim 1, further comprising a database associated with said server, a respective profile associated with a user of said first wireless device and a respective user of each of said at least second wireless devices being stored at said database.

3. The system of claim 1, further comprising a database, said database including a respective profile of a user associated with said first and second wireless devices, said database being stored in said respective first and second wireless devices.

4. The system of claim 1, wherein said profile includes contact information known to said first wireless device.

5. The system of claim 4, wherein said contact information is hidden from a user associated with said first wireless device.

6. The system of claim 1, wherein said server determines the distance from the specific location to the physical location and communicates the distance to said first wireless device for display on said wireless device.

7. The system of claim 1, wherein a user profile includes information known to said first wireless device, said first wireless device operating on said information to transmit a message to said at least second wireless device and said server providing profiles associated with said at least second wireless devices located at the specific location to said first wireless device.

8. The system of claim 7, wherein said first wireless device sends a message to said second wireless device responsive to at least one of the user profiles.

9. The system of claim 1, wherein said first wireless device is a cellular telephone.

* * * * *